United States Patent [19]

McIntyre

[11] Patent Number: 5,543,889
[45] Date of Patent: Aug. 6, 1996

[54] CAMERA WITH POINTING AID

[75] Inventor: Dale F. McIntyre, Honeoye Falls, N.Y.

[73] Assignee: Eastman Kodak Company, Rochester, N.Y.

[21] Appl. No.: 242,891

[22] Filed: May 16, 1994

[51] Int. Cl.$^6$ ...................................... G03B 13/00
[52] U.S. Cl. .................... 354/432; 354/400; 354/402; 354/64; 354/165
[58] Field of Search .................... 354/64, 165, 400, 354/432, 402

[56] References Cited

U.S. PATENT DOCUMENTS

| | | | |
|---|---|---|---|
| 3,442,193 | 5/1969 | Pagel | 95/44 |
| 4,702,245 | 10/1987 | Schroder et al. | 128/303.1 |
| 4,994,845 | 2/1991 | Naruse et al. | 354/415 |
| 5,130,739 | 7/1992 | O'Such et al. | 354/423 |
| 5,140,600 | 8/1992 | Rebhan | 372/25 |
| 5,150,146 | 9/1992 | Ueda et al. | 354/402 |
| 5,179,269 | 1/1993 | Horie et al. | 235/455 |
| 5,189,463 | 2/1993 | Capper et al. | 354/403 |
| 5,286,973 | 2/1994 | Westrom et al. | 250/253 |
| 5,302,997 | 4/1994 | Cocca | 354/402 X |

FOREIGN PATENT DOCUMENTS

| | | | |
|---|---|---|---|
| 2252836 | 2/1991 | United Kingdom | G03B 15/035 |
| WO93/13452 | 7/1993 | WIPO | G03B 13/02 |

Primary Examiner—Michael L. Gellner
Assistant Examiner—D. P. Malley
Attorney, Agent, or Firm—David A. Howley; Joseph F. Breimayer

[57] ABSTRACT

A camera having a pointing aid emitter that is operable by the user to produce a output beam generally aligned with the optical axis of the camera objective lens such that the output beam illuminates an object in the scene includes a timer for inhibiting repetitious operation of the emitter to reduce the risk of damage to the object that is illuminated by the beam. In a preferred embodiment of a still camera, the operation of the emitter is initiated by partial depression of the camera image capture button so that the beam is emitted and terminated prior to camera shutter opening. The scene captured on full depression of the image capture button is not illuminated by the beam. After light emission and is halted by release of the image capture button or time out of a maximum emission time interval, further attempts to repeat the operation of the emitter are inhibited for a set time period. In a further embodiment, a running time and maximum cumulative emission time interval are employed to allow repetitious emission of the output beam as long as the cumulative repetition time in the running time interval does not exceed the maximum cumulative time interval. The camera preferably includes an ambient light measuring system and a distance measuring system for providing automatic modulation of the power of the light beam emitted during each emission and inhibition of the emission at excessive or insufficient camera-to-object distances. The emitter preferably comprises a laser light source that produces a visible laser output beam.

32 Claims, 7 Drawing Sheets

CAMERA WITH POINTING AID

CROSS-REFERENCE TO RELATED APPLICATION

Reference is made to my commonly assigned co-pending U.S. patent application Ser. No. 08/201,827 filed Feb. 25, 1994, and entitled CAMERA WITH POINTING AID, incorporated herein by reference.

1. Field of the Invention

This invention relates generally to cameras and, more particularly, to cameras employing visible light pointing aids that are controlled to avoid prolonged emission of a pointing aid output beam onto an object.

2. Description of the Related Art

Cameras serve as image capture devices, taking pictures of an ambient scene through an objective lens. For example, a photographic still camera stores an image, either photo-electronically into memory or photo-chemically onto a filmstrip, when an image capture button, such as a shutter button, is fully depressed. In a still camera, pressing the image capture or shutter button causes a shutter to be tripped, which permits light from the scene to pass through the objective lens and fall onto a photo diode array or film strip located at a focal plane of the lens. A video camera or movie camera captures a sequence of images that, when played back, presents the illusion of motion.

A camera user typically looks through a camera view finder to aim the camera at a particular point or object in the scene that is of interest. At times, such as under low light conditions or in a crowded scene, it can be difficult to judge the point in the scene on which the camera is directed. At other times, such as when tracking fast moving objects in the scene or when picture taking discretion is desired, it might be desirable to aim the camera without looking through the view finder at all.

For these and other reasons, a variety of pointing aids that help a camera user determine where in the scene the camera is directed have been proposed. Generally, the pointing aid comprises a source of radiant energy, e.g. visible light, directed in an output beam that is substantially aligned with the optical axis of the camera taking or objective lens. If an object in a scene is illuminated with the output beam, the camera user is assured that light from the object will be directed through the objective lens and onto the focal plane for image capture. Aiming the pointing aid output beam onto an object of interest can be done with or without looking through the view finder, making it easier to aim the camera accurately at moving objects.

For example, U.S. Pat. No. 5,189,463 to Capper et al. describes a video camera with a laser pointing system that is said to obviate the need for looking through a view finder to aim the camera. British Patent No. 2 252 836 describes a security camera that includes a laser which is said to emit a beam that is aligned with the camera lens so that the camera can be aimed at a suspicious person to be photographed.

Emitted radiant energy, e.g visible light from a laser, LED or flashlight, is also commonly employed in automatic range finding systems for detecting the reflected light beam and automatically setting the focus of the camera taking lens, as disclosed in these patents and in commonly assigned U.S. Pat. No. 3,442,193 to Pagel. Such active auto focus systems set the camera focus and then allow the shutter to be opened to make the photographic exposure. An auto focus system is included with a laser pointing system of the type disclosed in the Capper '463 patent in PCT application publication No. WO 93/13452 to Capper.

For ease of aiming the camera in a rapid "point and shoot" motion, visible radiant energy emitted in an intense and tightly focussed output light beam is preferred. The output beam of a laser diode provides sufficient range and can be controlled in intensity, at a certain cost in battery energy consumed, to provide a visible spot on the object to be photographed even under bright ambient scene illumination.

While it is important that the emitted beam should be sufficiently bright to be readily seen by the camera user, it also is important that the beam not be so extraordinarily bright and applied for such a time period that it distracts persons or animals in the scene. In addition, it is important that the output power of the beam not be so great that objects, persons, or animals in the scene might be damaged by the beam. For example, if the pointing aid output beam produced by a laser were to enter through the pupil of a person or animal in the scene, and if the laser output power was sufficiently great, then the laser beam could possibly cause damage to the retina.

In each of the above referenced patents, the laser beam is emitted and aimed onto the object to be photographed or video taped each time or as long as the image capture button is depressed. As disclosed in the PCT '452 publication, steps are taken to ensure that the output beam is extinguished when the camera shutter is open, but the output beam is emitted again as soon as the shutter is closed. In the '463 patent, the laser output beam is delivered during each video frame blanking interval as long as the video camera is recording, so that the user can see the illuminated spot on the object continuously, due to the 60 Hz. repetition rate.

Problems to be Solved by the Invention

In my above-referenced, co-pending '827 application, the intensity of the laser beam is controlled in order to avoid excessive power drain and to reduce risk of damage or injury to objects, persons and animals in the scene. However, there is still a need for a camera with a pointing aid output beam that is visible under a variety of ambient conditions and does not use excessive power, and for a control system that reduces the risk of damage or injury to objects, persons, and animals in the ambient scene that could occur through ignorance of the danger or intentional mis-use of the aiming system. The present invention fulfills this need through a further inventive solution that may be practiced alone or in conjunction with laser beam intensity control of my above-referenced '827 application.

SUMMARY OF THE INVENTION

The present invention provides a camera with a pointing aid beam to assist a user in capturing images of a scene, the camera including a pointing aid emitter that produces a visible beam generally aligned with the optical axis of the camera objective lens such that the visible beam illuminates an object in the scene, a scene measurement system that measures an aspect of the scene, and an emitter controller that controls the rate or frequency of repetition of the emission of the output beam so as to limit the average output power delivered by the pointing aid emitter over time to a safe level.

The present invention is practiced in methods of operating a camera pointing aid for assisting a camera user in pointing the camera so as to capture an image of an object in a scene through a camera objective lens upon pressing an image capture button and apparatus for practicing the methods, the methods and apparatus comprising in one embodiment the steps of and means for: detecting the pressing of the image capture button of the camera; responding to the pressing of the button by emitting a visible-light output beam from an emitter such that the output beam is generally aligned with the optical axis of the objective lens and illuminates the object; and following emission of the light beam over a first predetermined emission time interval, inhibiting the further emission of the output beam in response to the repeated pressing of the button for a second predetermined, inhibit time interval so as to reduce the risk of damage to the object in the scene that is illuminated by the output beam through repetitious illumination of the object.

The methods and apparatus for practicing the methods preferably are realized by the steps of and means for: on detecting the pressing the image capture button, determining if emission is inhibited, and if not inhibited, starting the timing of the first, emission time interval and emitting the visible-light output beam from the emitter such that the output beam is generally aligned with the optical axis of the objective lens and illuminates the object; and following emission of the light beam for said emission time interval, terminating the emission of the light beam and starting the inhibit time interval.

The methods and apparatus are carried out in one embodiment preferably by timing the emissions of the light beam in response to repetitive depression of the button over a running time window to provide an accumulated emission time within the running time window; comparing the accumulated emission time to a reference cumulative emission time to provide an inhibit trigger signal when the accumulated emission time exceeds the reference cumulative emission time; and starting an inhibit timer in response to the inhibit trigger signal.

In one preferred embodiment the output power level of the pointing aid output beam is further controlled so that the camera user perceives the beam to be of equal brightness over a range of scene aspects, such as ambient light level and camera-to-object distance, so that power consumption by the emitter is reduced, and so that the risk of injury or damage is reduced. In this way, the pointing aid beam is visible under a variety of conditions using minimal power and with reduced risk of damage or injury to objects, persons, and animals in the ambient scene.

In another aspect of the invention, the pointing aid emitter comprises a laser light source that produces a visible laser beam generally aligned with the optical axis of the camera objective lens such that the laser beam illuminates an object in the scene whose image will be captured through the objective lens. The emitter controller preferably controls the output power of the laser in accordance with both the detected distance to a nearest object and the detected ambient light level.

Advantageous Effects of the Invention

In controlling the frequency of operation of the emitter output beam the emitter controller maintains the average power delivered over time to a safe limit. The user may not intentionally or inadvertently cause harmful emission levels by holding the capture release button depressed or repeatedly depressing the button.

BRIEF DESCRIPTION OF THE DRAWINGS

The above and other objects and features of the invention will become apparent from the following detailed description taken in conjunction with the preferred embodiments thereof with reference to the accompanying drawings, which illustrate, by way of example, the principles of the invention, in which like parts are designated by numerals throughout the views of the drawings and wherein.

DESCRIPTION OF THE PREFERRED EMBODIMENTS

The camera in which the pointing aid and control system of the present invention is provided can be any one of a variety of image capture devices, such as a still camera that records images into an electronic memory for storage or onto a silver-halide filmstrip for exposure, or a video camera, or a movie film camera. The preferred embodiments will be described in particular with respect to a photographic still camera of the general type depicted in FIG. 1.

Figure 1:
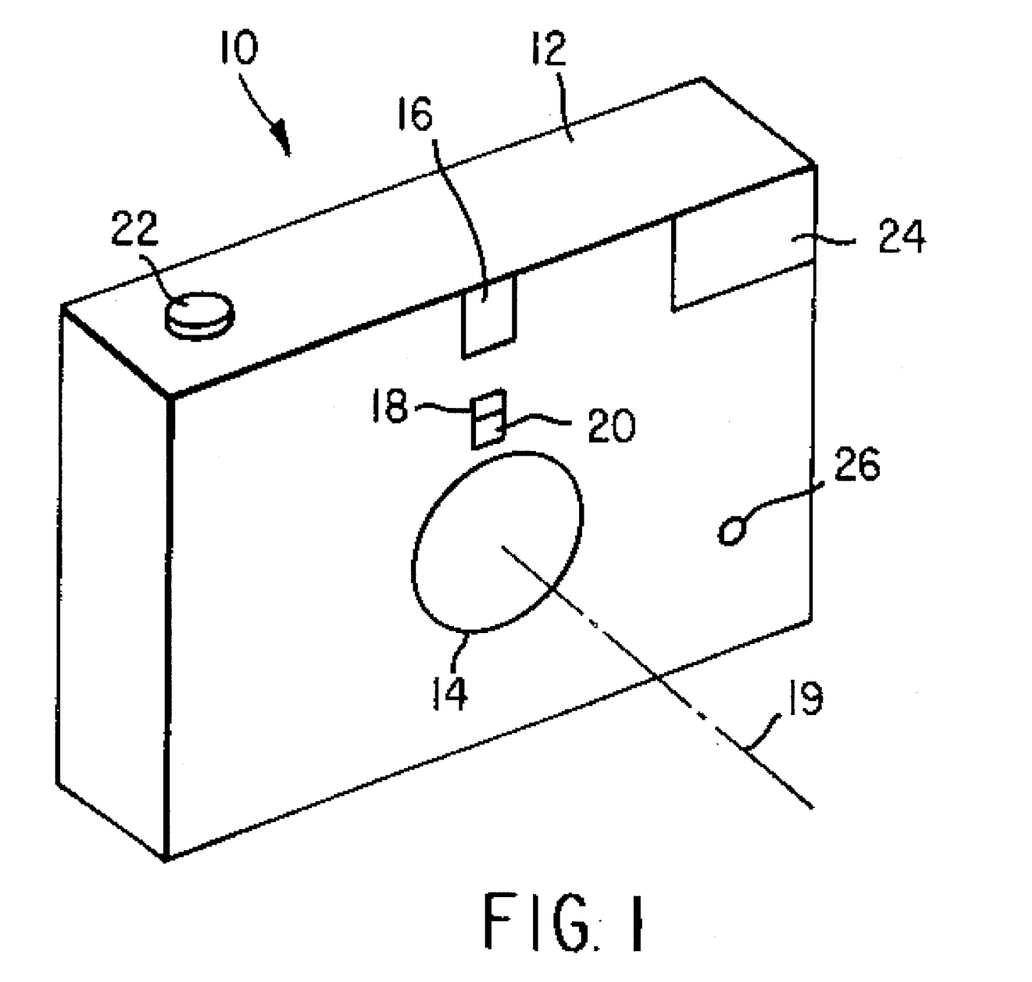
FIG. 1 is a perspective view of a camera constructed in accordance with the present invention.

FIG. 1 therefore illustrates a still camera 10 having a camera body 12 in which an objective lens 14 directs light from an ambient scene onto a focal plane for image capture. A camera user can view the scene through a view finder 16. The camera 10 includes a pointing aid emitter 18 that produces a visible light output beam generally aligned with the optical axis 19 of the objective lens such that the visible output beam illuminates an object in the ambient scene and appears, for example, as a readily visible small dot on the object. A scene measuring system 20 measures a characteristic or aspect of the scene, e.g. the level of ambient scene illumination for setting exposure parameters and controlling synchronous operation of the electronic flash unit 24 that provides supplemental illumination of the scene, if necessary.

In the above referenced, co-pending '827 application, the output power of the beam emitted from the pointing aid emitter 18 is adjusted in accordance with the measured scene aspect so as to increase beam visibility, minimize power consumption, and reduce the risk of damage to an object or person in the scene that is illuminated by the beam. The scene aspect that is used to control the pointing aid emitter 18 can assume a variety of measured characteristics. For example, the output power of the pointing aid beam can be controlled according to the detected amount of ambient light in the scene. Alternatively, the output power of the beam can be controlled in accordance with the distance from the camera 10 to an object of interest aligned with the optical axis 19 or to the object nearest the camera. The output power of the beam also can be controlled in accordance with both aspects, that is, the ambient light level and also the distance to the object.

The output power of the emitter beam can also be controlled manually by an optional adjustment switch 26. These beam intensity control features of the '827 application may be incorporated in a camera 10 in combination with the present invention.

Figure 2:
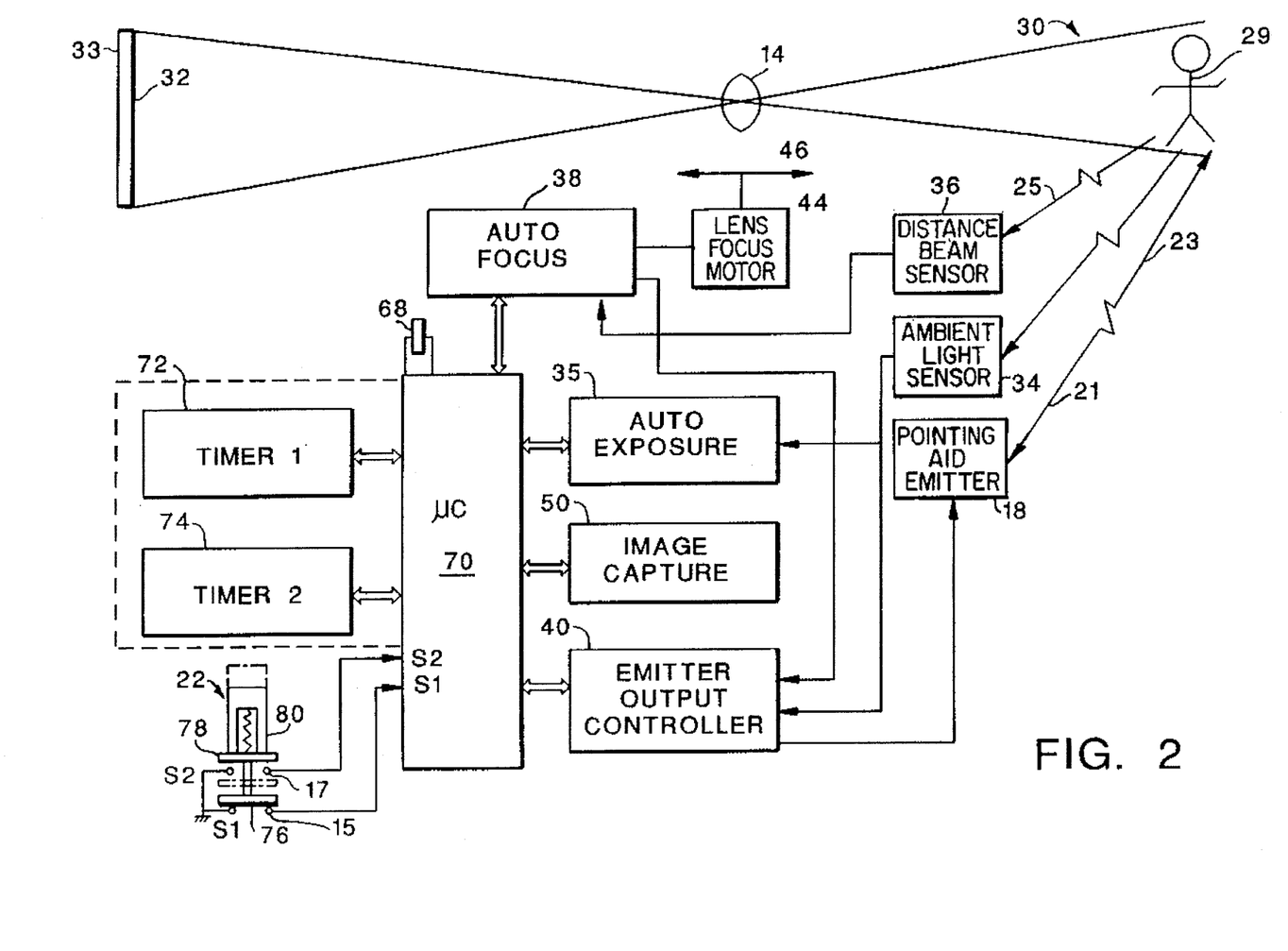
FIG. 2 is a schematic representation of the major electronic and mechanical component system of the camera illustrated in FIG. 1.

The camera 10 includes an image capture button 22 that is used to activate a mechanism of the camera 10 to capture an image of the ambient scene. In a still camera, the image capture button 22 may be referred to as a shutter release button and is typically a two-position switch. Touching the button or pressing the button to a first, "pointing" position activates the pointing aid emitter 18 (as well as other camera functions), and pressing the button to a second position deactivates the pointing aid emitter and activates the image capture mechanism of the camera 10. In a still camera, for example, the image capture mechanism or system comprises an aperture setting mechanism for selecting an aperture size and a shutter mechanism for opening the aperture during a shutter opening interval or shutter speed (neither illustrated). The aperture setting and shutter speed are derived by an automatic exposure control, or auto exposure, system that is part of the scene measuring system 20 that measures ambient scene illumination at a time after the image capture button 22 is touched or depressed to the first position when the output beam of the emitter 18 is off and before the shutter release mechanism operates. If the user touches and depresses the button 22 to the second, image capture position in a single motion, the camera's image capture system operation may be delayed to allow the completion of the operations of the emitter 18 and the auto focus system and the auto exposure control system. In any case, the emitter 18 is already turned off during image capture to ensure that the pointing aid output beam illuminating an object in the scene will not be visible in the captured image. FIG. 2 schematically illustrates the camera elements and electronic control system components involved in the control of the emission of the laser light output beam. FIG. 2 shows that the camera has a field of view such that light from an object 29 in the ambient scene 30 enters the camera 10 through the objective lens 14 and is directed onto a focal plane 32 at which an image capture medium 33 is located. The image capture medium can comprise, for example, electronic photoreceptors such as a CCD array for making a digital representation of the captured image or can comprise a silver-halide filmstrip or plate that is exposed and then developed in conventional photography.

The camera operating system of FIG. 2 preferably comprises a micro-controller or micro-computer 70 which typically includes a microprocessor, with on-chip RAM, ROM and associated circuits of a type, e.g the micro-processor based electronic control system for diverse camera functions disclosed in commonly assigned U.S. Pat. No. 5,130,739, incorporated herein by reference in its entirety. The micro-controller 70 is interconnected with the scene measuring system 20 and other components described hereafter and operates in one or more modes through operating software instruction sets for carrying out the inventive methods illustrated in the remaining figures. As illustrated in FIG. 2, the micro-controller 70 includes a first, emission Timer 1 block 72 and a second, inhibit Timer 2 block 74 which may be implemented as discrete, on board, counter IC chips that are loaded and down counted by the micro-processor or may constitute timer functions of the micro-processor memory registers to, in either case, time out the emission and inhibit times in a manner well known in the art. As described hereafter a single timer may be employed which is either loaded with the emission or inhibit time counts. In either case, the timers or timer form an integral part of the micro-controller 70 and are depicted within its architecture as indicated by the broken lines.

It will be understood that only the components of the camera operating system deemed necessary to explain the present invention are depicted in FIG. 2, and that the camera electronic control system illustrated may be combined with other components, e.g. artificial illumination, motorized filmstrip advance and rewind, etc. for controlling other camera functions. Before explaining the present invention, attention is first directed to the associated components of the camera system that are depicted in FIG. 2.

In a preferred embodiment, the scene measuring system 20 measures both ambient light level and camera-to-object distance or range. Thus, the scene measuring system 20 of the camera 10 includes an ambient light sensor 34 that receives and measures ambient light 23 from the scene 30 and includes a distance beam sensor 36 that receives light reflected off the object 29. The reflected light preferably may comprise the light that is emitted in the pointing aid output beam 21 from the pointing aid emitter 18, reflected off the object 29, and then received back at the camera by the distance beam sensor 36. The reflected light beam 25 is used to determine the distance from the camera to the object in a range finding operation known in the art.

In the preferred embodiment illustrated in FIG. 2, the ambient light sensor 34 and distance sensor 36 provide input signals to an auto exposure system 35 and an auto focus system 38 of the camera, respectively, when the image capture button 22 is depressed to make contact with a first set of terminals 15. The ambient light sensor 34 may be an image area photo diode or array of photosensitive elements that provide an ambient light signal or signals to the auto exposure system 35 that sets the exposure parameters, including the lens aperture diaphragm diameter and the shutter open time as described above in a manner well known in the art. The distance sensor 36 may be spaced linear arrays of photo diodes that provide signals to the auto focus system 38 that determines the camera-to-object distance in a range finding manner well known in the art. The auto focus system 38 processes the signals and controls focus setting of lens 14 through lens position adjustment in the direction of arrow 46 during the operation of the lens focus motor 44.

The pointing aid emitter 18 thus preferably comprises the emitter of the light beam 23 that is reflected from the object 29 in the reflected light beam 25 and sensed by the distance beam sensor 36. Alternately, two separate emitters of the same or different types may provide the output beam 21 for the pointing aid emitter 18 and a separate output beam for reflecting light off the object 29 in the reflected light beam 25.

In any case, the emitter light output beam 21 is preferably a small diameter laser light beam of a particular visible frequency. The auto exposure function should not be affected by the spot of light reflected from the object in bright ambient light conditions, as its energy in reflected beam 25 would be minor under such conditions. In low light conditions, it may augment the energy of the reflected light beam 25 and aid in setting proper focus. With respect to the auto exposure function, the energy of the reflected laser light in the measured ambient light 23 is so tightly focused that it should have negligible effect on the spot or area averaging auto exposure operation. Or the particular laser frequency may be filtered out at the ambient light sensor 34.

In accordance with one embodiment of the invention, the emission of the output beam 21 is controlled by an emitter controller operation comprising emitter output controller 40, image capture button 22, and micro-controller 70, including timers 72 and 74 or a single timer, operating under the software program illustrated in FIGS. 3–10. The emitter controller operation controls the output power during delivery of each output beam and establishes the rate or frequency of repetition of the beam by the states of the timers 72 and 74 to control the average beam power delivered over time upon the object 29.

In a further embodiment, the emitter output controller 40 also controls the emitter 18 to adjust the output beam 21 power during each emission cycle in accordance with the ambient light signal provided by the ambient light sensor 34 (or a signal processed by the auto exposure system 35) and, optionally, the distance to the object 29 information determined by the auto focus system 38. As described more fully in the above-referenced, co-pending '827 application, in this preferred embodiment, the emitter 18 is pulsed on and off to modulate beam power or energy delivered in each pulse but at a frequency sufficiently high that the output beam 21 is perceived to the eye to be steadily illuminated. The beam output power is thus modulated by controlling the duty cycle of the emitter 18. Alternatively, the beam output power may be a constant, fixed value established in the emitter output controller without regard to ambient light level or the camera-to-object distance.

The image capture button 22 illustrated schematically in FIG. 2 is a spring loaded three position switch and can be depressed from a rest position to the pointing position closing the first set of terminals 15 and to the image capture position to close the first and second set of terminals 15 and 17. The button 22 is coupled to the parallel switch segments 76 and 78 through a load spring and shaft 80. The first set of terminals 15 are closed by the switch segment 76 when the button 22 is depressed to the pointing position depicted in FIG. 2. Further depression of the button 22 compresses the load spring and pushes the switch segment 78 across the second set of terminals 17 to develop the timing trigger signal S2. Any switch construction, including separate switches or commands, that provides the timing trigger signals S1 and S2 in sequence may be substituted for the depicted construction of image capture button 22.

When the first set of terminals is closed, the signal S1 is applied to the micro-controller 70. When the second set of terminals 17 is closed, the signals S1 and S2 are applied to the micro-controller 70. As depicted, signals S1 and S2 are at battery or a regulated voltage B+, although the signal level may typically be at ground level, since the leading edge of the signal is processed to activate the timing functions as described below. Thus, the signal leading edges at the closure of the first and second sets of terminals provide the timing trigger signals S1 and S2 although the state of the trigger signals S1 and S2 may be queried and employed in certain operations. For example, a timing trigger signal S1 may start on the leading edge closure of terminals 17 and end on leading edge closure of terminals 15. Timing trigger signal S2 may commence on leading edge closure of terminals 15 and end a fixed time later, independent of when the user releases the image capture button 22. The following discussion assumes such a generation of the trigger signals S1 and S2.

Figure 8:
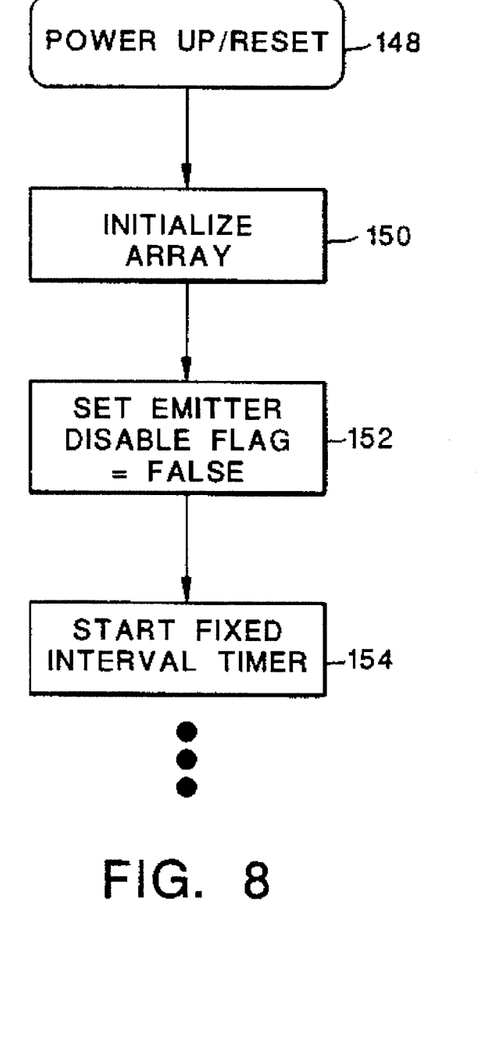
FIGS. 8–10 are flow charts illustrating a further mode of operation of the camera system of FIG. 2 relating to the emission and inhibition of the visible light output beam over a running time interval.
Figure 9:
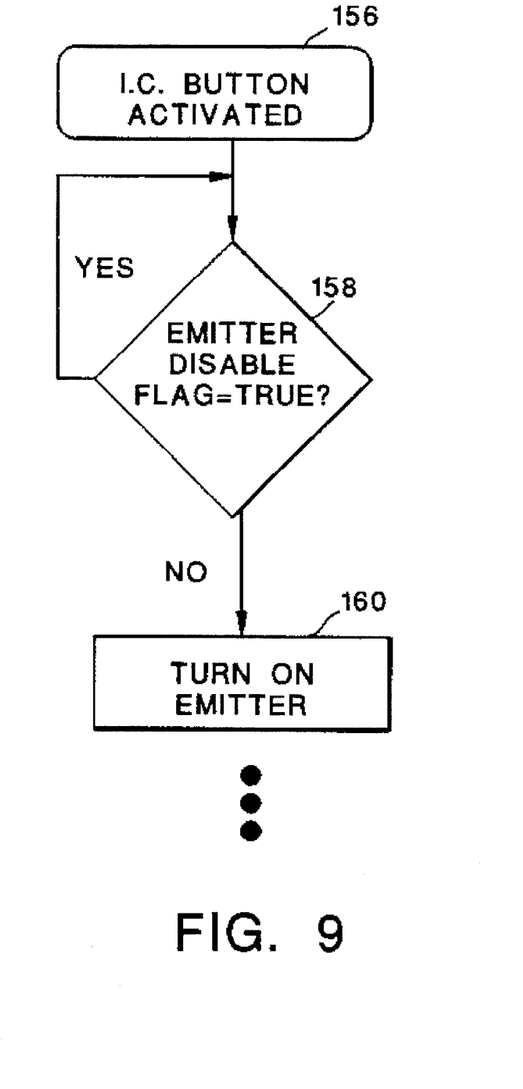
Figure 10:
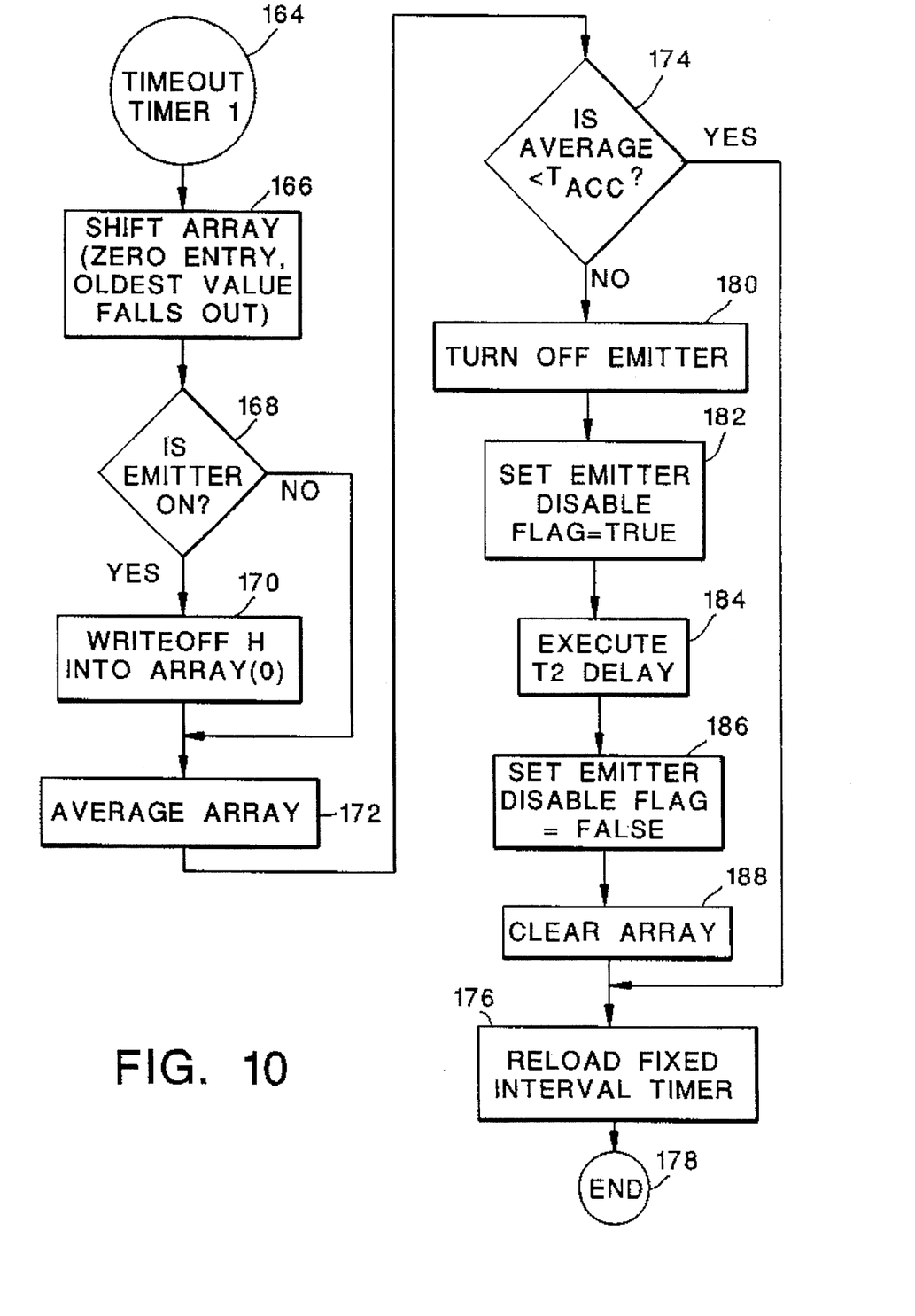

Before proceeding further with the description of the preferred embodiments, it should also be noted that microcontroller based camera operating systems also include power down circuitry that responds to a prolonged period of inactivity or the closure of a lens cover or an on-off switch to power down the operating system and power up circuitry that responds to these events to restore power and initialize the operating system as explicitly shown in FIGS. 8–10.

Typically, the user depresses the image capture button 22 fully and then releases it in a single motion so that the first and second trigger signals are simultaneously provided only momentarily. In a further variation, the construction of image capture button 22 may be changed so that the first trigger signal S1 at the first set of terminals 15 is extinguished when the user further depresses the image capture button 22 to close the second set of terminals 17 and generate the second trigger signal S2. The timing operations may be responsive to the leading edges of the trigger signals S1, S2, and the last trigger signal state may be memorized for use in the program and interrupt service routines described below where it is necessary to query the state of the image capture button 22.

It is anticipated, that the user will intentionally press the image capture button to the pointing position and point the camera around the scene until the spot of light is visible on the desired object effecting a power up/reset function, if the camera was previously powered down. During that selection process, the auto focus and auto exposure operations commence and continue, as in the typical automatic camera system. The micro-controller 70 enables the pointing aid emitter 18 to be operated to emit the light beam 21 to enable camera aiming if the inhibit time interval T2 has elapsed since the last emission of the output beam 21. At the same time and even if output beam emission is inhibited, the auto exposure system 35 sets the exposure parameters and the auto focus system 38 sets the taking lens 14 focus, as the scene shifts during camera aiming. The auto exposure and auto focus functions are completed in a relatively short measure and set time intervals which is governed by the micro-controller 70. Once aiming is completed, the user may fully depress the image capture button 22 to provide the trigger signal S2.

The trigger signal S2 is employed by the micro-controller 70 to first extinguish the emitter output beam (if it has not already been extinguished by time out of the emission time interval) and to then enable image capture by the image capture system 50. In the photographic still camera embodiment, this operation involves opening and closing the shutter for the exposure interval, operating the artificial flash illumination synchronously with the shutter opening and operating a filmstrip advance motor, if provided. Other information recording operations may also be accomplished. Then, the camera is ready to again make an exposure.

In accordance with one method of operation of the preferred embodiment of the present invention, each time the camera button 22 is depressed partially to the pointing position and released or depressed fully to the image capture position commences an inhibit interval T2 to prevent the user from using the pointing aid output beam until the inhibit interval times out. The inhibit time interval in this simple mode would ordinarily be fixed to about 3 seconds and include the time that the camera components take to complete the image capture and motorized film advance operations. The inhibit time interval T2 in the two timer embodiment of FIG. 2 is provided by loading the counter of Timer 2 block 74 to a timeout count value T2 at generation of the trigger signal S2 and down counting to a certain count. The user may operate the camera to take photographs at a faster rate than the inhibit time interval T2 times out, but would only be able to enable the emission of the output beam after timeout of the most recent inhibit time interval T2. During the inhibit time interval T2, the active auto focus system 38 would not be enabled to reset focus through operation of the auto focus system 38.

In a second method, which may be combined with the first method, the emission time of the output beam 21 is limited to the emission time interval T1 if the user depresses the button 22 to the pointing position continuously for a prolonged time interval and does not depress the button 22 to the image capture position. Thus, the emission is extinguished if the user depresses the button 22 to the pointing position for a time exceeding the timeout of the emission time interval T1 and may not be re-initiated until the lapse of the inhibit time interval T2. In this method, the continuous emission time interval T1 may be on the order of 3–5 seconds and the inhibit time interval T2 may again be on the order of 3 seconds. Again, the camera may be used to take photographs without use of the pointing aid and the auto focus system 38.

In these methods, Timer 2 block 74 provides the 3 second inhibit interval T2 between each successive emission of the output beam 21 regardless of how long the user has depressed the button 22 to the pointing position. In a further method, which may be combined with the above methods, successive emissions of the light output beam 21 (caused by depressions of the button 22 to the pointing position) each shorter than the maximum emission time interval T1 are allowed to take place and continue so long as the accumulated emission time in a running time window does not exceed a pre-set percentage of the running time window or a fixed cumulative time interval threshold. The emission of the output beam is extinguished and the inhibit time interval T2 commenced upon exceeding the cumulative time interval threshold which may or may not be the same as the emission time interval T1.

Through each of these methods, the power delivered over time by the laser light output beam is maintained at an average that falls below an exposure standard to protect the retina from damage. The prolonged or repeated exposure of the retina to the energy in the emitted beam could cause injury since the accumulated power delivered could exceed a dangerous level.

Figure 3:
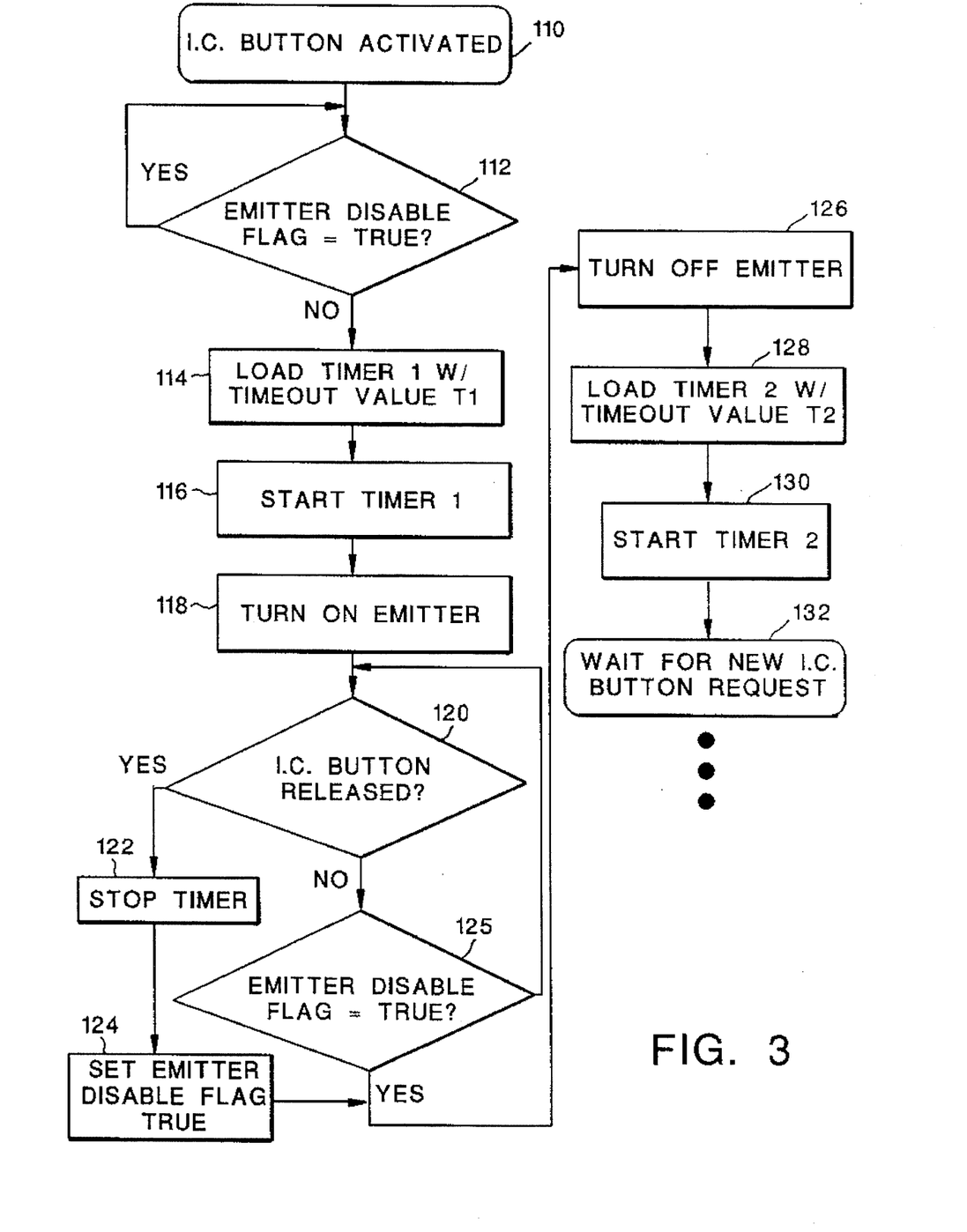
FIG. 3 is a flow chart of one mode of operation of the camera system of FIG. 2 relating to the emission and inhibition of the visible light output beam.
Figure 4:
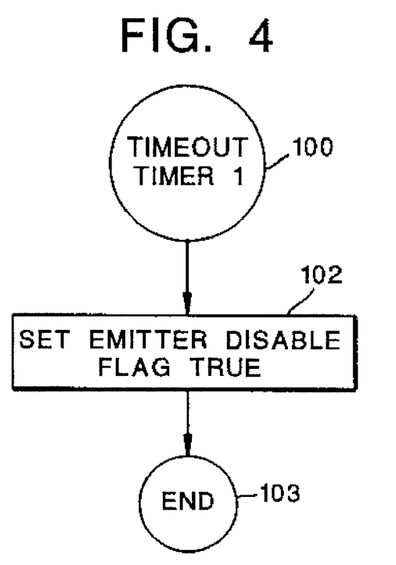
FIG. 4 is a flow chart of the timer interrupt service routine of the first, emission timer setting the maximum light output beam emission time interval.
Figure 5:
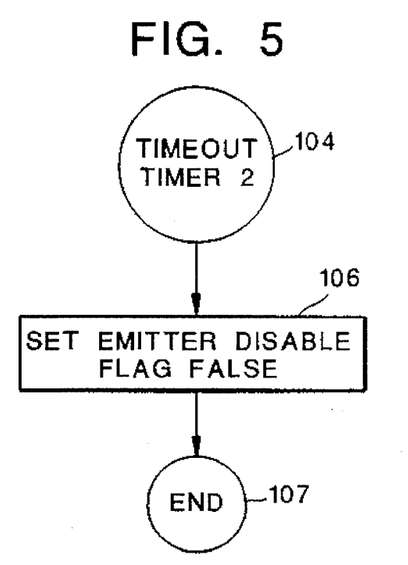
FIG. 5 is a flow chart of the timer interrupt service routine of the second, inhibit timer setting the light output beam inhibition time interval.
Figure 6:
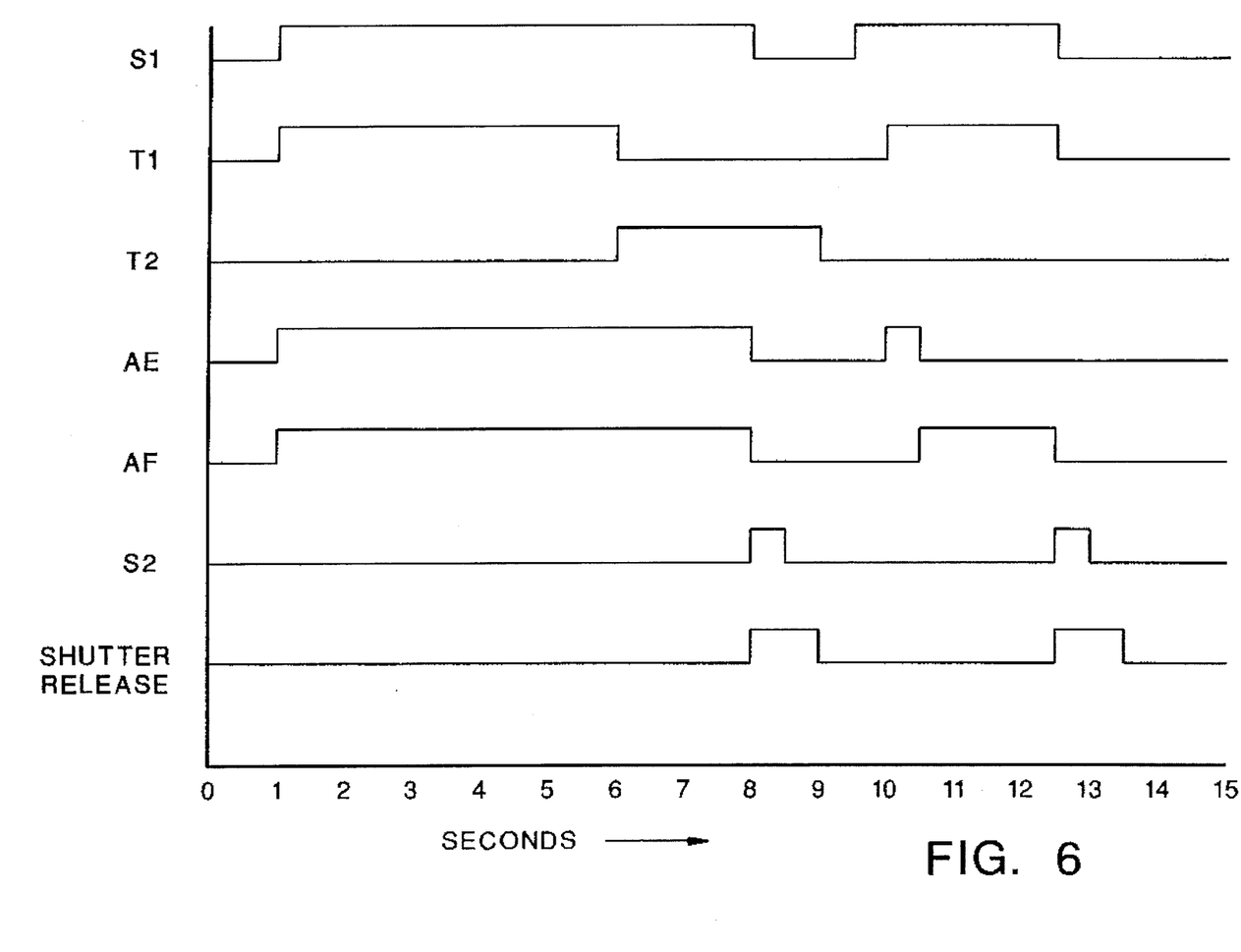
FIG. 6 is a timing diagram of the operations of FIGS. 3–5.

FIGS. 3–5 viewed together with the timing diagram of FIG. 6 illustrate these methods in a flow chart for setting the emission and inhibit time intervals by the timers 72 and 74 (referred to as Timer 1 and Timer 2 in FIGS. 3–5). FIGS. 4 and 5 are timer interrupt service routines for the time out of the emission and inhibit time intervals, T1 and T2, respectively. The timeout of Timer 1 block 72 (in FIG. 2) in program block 100 sets a laser emission disable flag to "True" in block 102. Similarly, the timeout of Timer 2 block 74 (in FIG. 2) in block 104 sets a laser emission or emitter disable flag to "False" in block 106. The laser disable flag setting is queried in the main operating program of FIG. 3 at two points in the operation.

In FIGS. 3 and 6, when the image capture button 22 is partially depressed to the pointing position of FIG. 2, the trigger signal S1 is generated and detected at block 110 as "I.C. Button Activated". The state of the emitter disable flag set in either block 102 or 106 is queried at decision block 112. If the flag is "True", then the inhibit Timer 2 (i.e., Timer 2) is still timing out, and the micro-controller 70 inhibits emitter output controller 40 to prevent the emission of the laser light output beam 21. If the laser disable flag is "False", then the inhibit Timer 2 has timed out per the interrupt service routine of FIG. 4, and the emission Timer 1 is loaded with the down count timeout value T1 in block 114. Timer I is started in program block 116, and the emitter output controller 40 is enabled in block 118 to energize the emitter 18, while the auto exposure system 35 and auto focus system 38 continue their functions as the user aims the camera.

In FIG. 6, these events are depicted starting in the first instance at time 1.0. The auto exposure and auto focus functions continue as long as trigger signal S1 is present and are disregarded, if they continue when the trigger signal S2 is generated. The user continues to depress the button 22 presumably to point the camera at the object until the button 22 is fully depressed at t=8.0, when the second trigger signal S2 is generated. The duration of trigger signal S2 is set by the camera image capture operations, whereupon both trigger signals S1 and S2 terminate. The shutter release functions in this simple example are completed at time t=9.0, although motorized film advance, if present, may continue for another second or so.

In the first example of FIG. 6, the user has depressed the button 22 and generated trigger signal S1 for 7.0 seconds, which exceeds the maximum emission time interval T1, which is set at 5.0 seconds in this illustration. Thus, at t=6.0 the Timer 1 times out, and the emitter disable flag is set to true in block 102 of FIG. 4. At the same time t=6.0, the inhibit Timer 2 commences timing out. The auto exposure and auto focus functions continue until time t=8.0 seconds.

Returning to FIG. 3, these operations are carried out in blocks 120–130, but it should be noted that when the button 22 is either released or fully depressed to the image capture position (resulting in its automatic release as described above), the response to decision block 120 changes. First considering the time prior to time t=8.0, the status of the first trigger signal S1 is monitored in decision block 120, and the status of the emitter disable flag is monitored in decision block 125. The emitter disable flag remains "False" until the Timer 1 times out (FIG. 4) or the image capture button is released or fully depressed, whichever occurs first.

In the first example of FIG. 6, the emission Timer 1 times out before the button 22 is either released or fully depressed to generate the second trigger signal S2. At time t=6.0, the laser disable flag is set to "True" by the timer interrupt service routine of FIG. 4, satisfying decision block 125, and the laser emitter 18 is turned off by a command of the micro-controller 70 to the emitter output controller 40 per block 126. At the same time, the Timer 2 block 74 is loaded with the count value to time out the inhibit time interval T2 in block 128 and started in block 130. The program then waits for a trigger signal S1 to be generated in block 132.

If the button 22 is again depressed to the pointing position and the signal S1 is generated while the inhibit Timer 2 block 74 is still timing out, the signal S2 is detected at block 110. The laser disable flag is still set to "True", according to FIG. 4, since the inhibit Timer 2 is still timing out. Thus, the trigger signal S1 causes the decision block 112 to query the state of the laser emitter disable flag in block 112. Since the flag is "True", the response is "YES", and the state of the shutter button continues to be monitored while the Timer 1 block 72 is not loaded and started in blocks 114 and 116, and the laser light emitter is not turned on in block 118.

Whether or not the user continues to depress the button 22 to the image capture position and generates the second trigger signal S2 is not material to this operating program as long as the inhibit Timer 2 is still timing out and the emitter disable flag is still set at "True". The steps of blocks 114–118 cannot be followed under that condition. Therefore, the emission of the pointing aid light output 21 beam cannot be restarted in block 118, and the inhibit Timer 2 cannot be re-loaded and started in blocks 128 and 130. In this fashion, the duration of emission is controlled to no more than the emission time interval T1 for each partial or full depression of the button 22 to the pointing position. Only a single inhibit time interval T2 is triggered in response, and interval T2 cannot be indefinitely prolonged by continued intermittent depression of the image capture button 22.

The user can, however, take photographs without the benefit of the laser light output beam 21 while the inhibit time interval T2 times out, and the emitter output controller 40 is again enabled after the inhibit time interval T2 times out. This operation allows the camera to be used to take a picture on the assumption that the user is still aiming the camera at the same object. When the user depresses the image capture button 22 in this instance, it will be apparent to the user that the laser light output beam was not emitted, and the user can decide to fully depress the image capture button and make the exposure. The user may alternatively be alerted by audio or visual indications that the aiming and auto focus functions are disabled on initial depression of the image capture button.

The user may partially depress the image capture button 22 several more times in rapid succession, closing the first set of terminals 15, trying to trigger generation of the laser output beam 21. The effort will be fruitless until the inhibit time interval T2 times out. Thus, the user will learn to wait until time out occurs if it is desired to shift to a new scene 30 or object 29 in the scene.

In the second instance depicted in FIG. 6, the user depresses the button 22 at time t=9.5 and completes full depression of button 22 at t=13.0. In this instance, the preceding inhibit time interval T2 has timed out, but this is not necessary. In either case, once the emitter disable flag is False, the emission interval Timer 1 is loaded and started in blocks 114 and 116 and the laser light emitter is restarted in block 118.

In the depicted second instance, the shutter button 22 is fully depressed to provide trigger signal S2 before emission time interval T1 Timer 1 times out, and the image capture button is released satisfying decision block 120. When this occurs, Timer 1 is halted in block 122, and the emitter disable flag is set to "True" in block 124 to turn off the laser light emitter in block 126 and again start and time out the inhibit time interval T2 in blocks 128 and 130.

In the methods depicted and described above, two timers 72 and 74 are employed sequentially as Timer 1 and Timer 2. Alternatively, it is possible to use a single timer or register and to load the same timer with the time out values for timing the emission and inhibit time intervals T1 and T2 sequentially. In this variation of the general operating program of FIG. 3, the Timer 1 of blocks 114 and 116 would be the same as Timer 2 of blocks 128 and 130. In this variation, the timer interrupt service routines of FIGS. 4 and 5 would be changed to the single timer interrupt routine depicted in FIG. 7.

Figure 7:
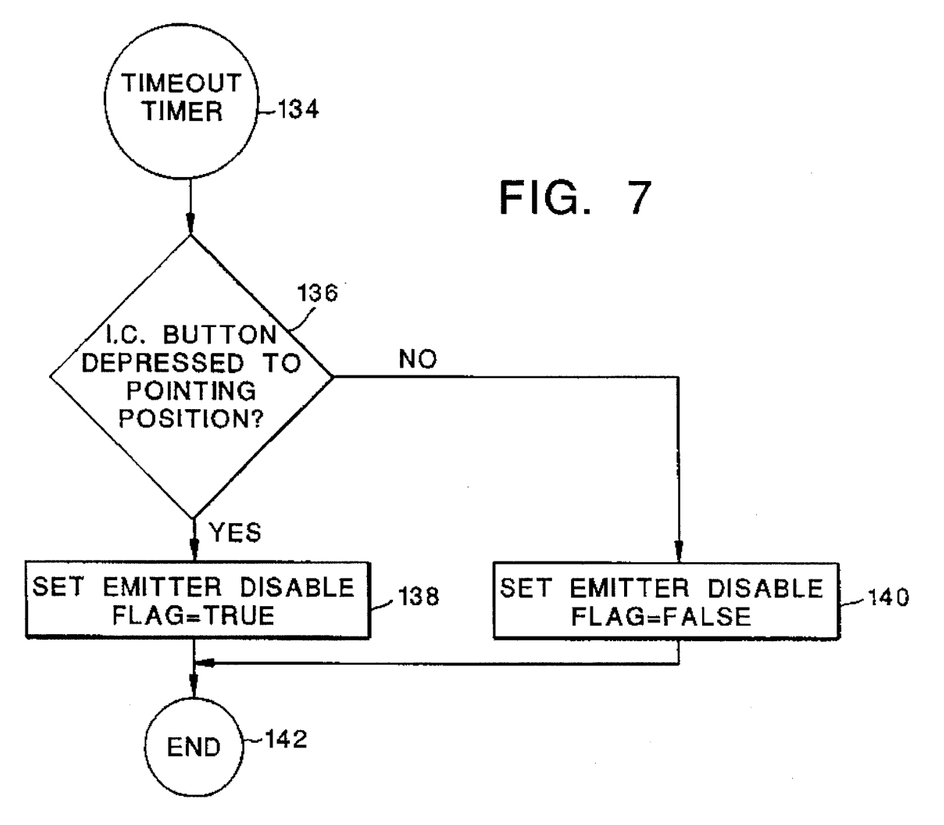
FIG. 7 is a flow chart of a timer interrupt service routine for both the emission and inhibit time intervals used with a variation on the flow chart of FIG. 3.

The timer interrupt service routine of FIG. 7 starts at the timeout of the single timer at start block 134. At that time, the state of the image capture button 22 is queried to determine if it is depressed to generate the trigger signal S1 in decision block 136. If signal S1 is present, then the inference is that the timer was previously loaded to time out the emission time interval T1. The emitter disable flag is set to "True" in block 138, ending the interrupt service routine. If the timer has been timing out interval T1, the "True" flag satisfies decision block 125 of FIG. 3. The timer is loaded with the inhibit time interval T2 timeout value in block 128 and started in block 130 as the emitter output controller 40 is instructed to cease emission of the output beam in block 126.

Then, at the subsequent timeout of the single timer at start block 134, the position of the button 22 is again queried at decision block 136. If the first trigger signal S1 is not present, the inference is that the timer was timing out the inhibit time interval T2. The emitter disable flag is then set to "False" in block 140, enabling the emission program of FIG. 3 to be repeated in response to a subsequent depression of the button 22 at block 110.

However, if the image capture button 22 is depressed by the user and provides the first trigger signal S1 at that timeout, the emitter disable flag will remain set to "True" in block 138. The "True" flag state would satisfy the decision block 112 of FIG. 3, preventing the loading of the emission time interval T1 and the emission of the light output beam. The user would see that the output beam 21 is not emitted and release or fully depress the button 22 satisfying block 136 and setting the emitter disable flag to "False". Then, at the next activation of the image capture button, block 112 would be satisfied allowing the repeat of the steps of blocks 114–132. After the next timeout, the timer interrupt service routine of FIG. 7 would be repeated with the presumption that the timer has been timing out the emission interval T1.

In these methods of operation, once the user depresses the button 22 to the pointing position, and the laser light output beam 21 is generated, it cannot be restarted until time out of the inhibit time interval T2, no matter how short the actual emission time. In the further embodiment of the invention depicted in the flow charts of FIGS. 8–10, the emission of the light output beam 21 is allowed each time the button 22 is depressed to the pointing position until the cumulative emission time in a running time window expressed in seconds extending back in time from the point of measurement does not exceed an accumulated emission time threshold stated as a percentage of the running time window. The accumulated emission time threshold may be either a fixed time value or a percentage of the running time window. For example, the running time window may be on the order of 8 seconds, and the cumulative emission time threshold may be either 6 seconds or 75% of the running time interval. Again, the inhibit time interval T2 may be on the order of 3 seconds and timing functions may be accomplished by discrete IC timers or be functionally carried out by the timing functions programmed into the micro-controller 70. Since continuously running timing functions is current intensive, it is desirable to only commence the operations depicted by FIGS. 8–10 when camera usage is about to commence.

Turning first to FIG. 8, it depicts a power up/reset operating routine commenced when the camera user takes some action, e.g. depressing the image capture button 22 after a long time delay, to cause the operating system to power up after power down as described above. In FIG. 8, the power up and reset function may be employed to initialize an array of memory registers in block 150 into which emitter on state data will be written on a FIFO basis as the state is sampled at a rate governed by a fixed sampling interval timer. At the same time, the emitter disable flag is set "False" in block 152 and a the fixed interval timer, e.g. Timer 1, block 72, may be commenced in block 154. In this case, the fixed interval timer times out shorter sampling times, e.g. a 0.5 or 1.0 second fixed intervals. The array may be incremented and store 16 state values sampled every 0.5 second or 8 state values sampled every 1.0 seconds, so that the array represents 8 seconds of emitter state when filled. Thus, the array operates as an 8 second running time window and may store the cumulative emission time to be compared to an accumulated emission time threshold to trigger the 3 second inhibit time interval. A number of other camera functions may be initiated on power up that are unrelated to the present invention.

The sampling of the emitter state and loading of the array occurs each time the fixed sampling interval timer times out at 164 in FIG. 10. The image capture button may be actuated in block 156 of the routine of FIG. 9 at any time to initiate the emission of the light output beam, unless emission is inhibited. At block 158, the status of the emitter disable flag is queried, and emission is triggered in block 160 if the flag is "True". The routine of FIG. 10 determines whether emission is permitted or inhibited by setting the emitter disable flag accordingly.

The FIG. 10 interrupt routine is entered to shift the array on a FIFO basis at block 166 and write in the state of the emitter every time Timer I times out at 164. If the emitter is on, as determined in block 168, the "True" state is written into a register of the array at block 170. If the emitter is not on the state is unchanged at the initialized "not True" state. After the array is written into in block 170, the states are averaged (i.e. the True states are summed and compared to the total number of states in the array) in block 172 to provide a representation of the cumulative emission time over the immediately preceding 8 second interval. That cumulative emission time interval is compared to an accumulated emission time threshold in block 174.

For example, the accumulated emission time threshold may be 5 out of 8 seconds for an average of 62.5% of the running time window. The threshold may not be exceeded, if the user were to depress and release the image capture button repetitively every 4 seconds, since the 50% average would not exceed the threshold in that case. Then, since the interrupt routine of FIG. 10 is entered every time the sampling interval timer times out, the routine reloads the fixed interval Timer 1 to time out the sampling time in block 176.

If the accumulated emission time threshold $T_{acc}$ is exceeded in block 174, then the emitter controller is commanded to turn off the emitter in blocks 180–188 until the inhibit time interval T2 times out. The emitter disable flag is set to "True" in block 182 to prevent the image capture button from having any effect in the routine of FIG. 9. The Timer 2, block 74, is loaded and down counted in block 184 to timeout the inhibit time of 3 seconds, for example. After timeout of the inhibit time interval T2, the registers of the array are cleared to the "not-True" state as initialized in block 186, and the emitter disable flag is set "False" in block 188 to clear the way for re-starting emission on depression of the image capture button 22 in block 156.

All of the above described modes of emitter control are effected through the operation of the micro-controller 70 providing commands to the emitter output controller 40. In addition, all of the above methods and embodiments of the invention contemplate the operation of the emitter output controller 40 to provide either the fixed intensity light output beam or the variable intensity/duty cycle light output beam of the above-incorporated '827 application. Preferably, if the latter operation is provided, an override switch is also provided to allow the user to switch to the fixed intensity operation. It may be desirable to vary the emission time interval T1 or the cumulative emission time interval threshold and the inhibit time interval T2 to the intensity of the emitted light output beam depending on the light intensity applied in either operating mode.

A further user operated switch may be provided to allow the user to disable the emitter output controller 40 and the above described timing operations at low battery voltage to allow the camera to be continued to be operated until replacement batteries can be loaded or for other reasons where use of the pointing aid is either unnecessary or inappropriate.

The FIG. 2 embodiment of the camera system includes a pointing aid emitter 18 that is integrated with the automatic exposure system 35 and automatic focus system 38 of the camera operating system. As noted, it is not necessary to include all of these systems in the camera, and it is not necessary to control the pointing aid beam 21 in accordance with both systems. It should be noted that the camera may include a passive automatic focus or automatic distance measuring system that does not depend on or is not influenced by the emitted light output beam 21. In such a case, the auto focus operation may be conducted each time the image capture button is depressed to the pointing position whether or not the light output beam is emitted.

Those skilled in the art will appreciate that other implementations of emitter control are possible for other types of cameras to avoid the presence of the pointing aid output beam on objects in the captured images. For example, the image capture button of a video camera is depressed continuously during video image recording, and emission of the output beam would be electronically synchronized to the vertical blanking interval. In accordance with the present invention the frequency at which the output beam may be emitted would be controlled by timing and counting the number of image frames recorded and periodically allowing the output beam to be emitted during a vertical blanking period. In a video camera, the image capture button is typically held closed continuously while recording takes place. Thus emission may be selectively user actuated and take place continuously while actuated but periodically inhibited to provide an average emission rate below a threshold. For example, emission may be inhibited despite continuous actuation as a function of image frame timing to effect an average emission rate and on time that is less than that possible if emission were allowed during every vertical blanking interval.

Although the system of FIG. 2 is primarily implemented in a micro-controller based camera operating system, it will be understood that the various methods of operating and means for performing the operations described above may also be implemented in digital logic blocks and components arranged in the equivalent camera electronic control and operating system. In such an implementation, the timer 38 of the embodiment of FIGS. 2 and 3 may constitute a discrete timer or timers or the time periods may be calculated by operation of the micro-processor, both methods being well known in the art. Moreover, both the calculation of the variable output beam power and/or the inhibit time interval T2 could be accomplished by the digital camera operating system each time an output beam 21 is delivered. Similarly, in the video camera implementation, the rate or frequency of delivery of the output beam could be calculated by the digital logic operating system as a function of the calculated variable or the fixed output pulse power as the camera is directed by the user from scene to scene.

Thus, when employing a fixed power output beam set at a certain average brightness and object distance, the rate of emission may increase (or the inhibit time interval signal T2 may be decreased) within a safe range as it is necessary to compensate for increased object distance or ambient brightness.

Conversely, the rate of emission may decrease (or the inhibit time interval T2 may be increased) within the safe range as it is necessary to compensate for increased object distance or ambient brightness. In such an implementation, the ambient light signal from the ambient light sensor 34 and the object distance calculated by the auto focus system 38 of FIG. 2 may be employed by the micro-processor to calculate the count to be loaded into a counter to set the rate of emission in the video camera embodiment or the inhibit time interval T2 in the still camera embodiment. When employing a variable power output beam 21, the same calculations may be made, but the range of the emission rate and inhibit time interval T2 would be narrowed as the output beam power is varied.

Thus, a camera constructed in accordance with the present invention emits a pointing aid beam that can assist a camera user in pointing the camera to capture the image of an object of interest with or without using a view finder. The average output power of the beam is controlled by frequency of emission so that the user cannot intentionally or inadvertently repetitively operate the pointing aid output beam. In accordance with the invention, the emitter output controller is operable following emission of the visible laser output beam for inhibiting the further response of the pointing aid emitter output controller to the pressing of the image capture button for a pre-determined time interval so as to reduce the risk of damage to the object in the scene, particularly the retina of a person or animal, that is illuminated by the output beam.

The present invention has been described above in terms of presently preferred embodiments so that an understanding of the present invention can be conveyed. There are, however, many configurations for camera pointing aids not specifically described herein, but with which the present invention is applicable. The present invention should therefore not be seen as limited to the particular embodiments described herein, but rather, it should be understood that the present invention has wide applicability with respect to camera pointing aids generally. All modification, variations, or equivalent arrangements that are within the scope of the attached claims therefore should be considered within the scope of the invention.

The following elements and their corresponding reference numerals are used in the drawings:

camera 10
camera body 12
objective lens 14
first set of terminals 15
view finder 16
second set of terminals 17
pointing aid emitter 18
objective lens optical axis 19
scene measuring system 20
output beam 21
image capture button 22
ambient light 23
flash unit 24
reflected light beam 25
emitter adjustment switch 26
adjustment switch signal line 27
object 29
ambient scene 30
focal plane 32
image capture medium 33
ambient light sensor 34
automatic exposure system 35
distance beam sensor 36
automatic focus system 38
emitter output controller 40
lens focus motor 44
arrows 46
time delay one shot 48
image capture system 50
system clock 68
micro-controller 70
Timer 1 block 72
Timer 2 block 74
switch segments 76 and 78
load spring and shaft 80
program blocks 100-188

I claim:

1. A camera comprising:

a camera body;

an objective lens that receives light from a scene and directs it to an objective lens focal plane in the camera body upon operation of an image capture mechanism;

an image capture button that may be operated in an image capture position to effect operation of said image capture mechanism and may be operated in a further position;

a pointing aid emitter that emits a light output beam oriented generally along the optical axis of the objective lens such that the camera may be aimed so that the output beam illuminates an object in the scene upon operation of said image capture button in said further position; and an emitter controller operable following emission of the output beam for inhibiting the further response of said pointing aid emitter to the operation of said image capture button in said further position for a predetermined inhibit time interval.

2. A camera as defined in claim 1 wherein said emitter controller further comprises:

means for setting a maximum emission time interval;

an emission timer for timing an emission time interval commencing with the operation of said pointing aid emitter and terminating at the lapse of said maximum emission time interval;

an inhibit timer for timing said predetermined inhibit time interval on timing out of said maximum emission time interval by said emission timer; and an emitter output controller that is inhibited by operation of said inhibit timer for said inhibit time interval and supplies the output power of the pointing aid emitter only when said inhibit timer has timed out said predetermined inhibit time interval.

3. A camera as defined in claim 2 further comprising:

means for detecting the camera-to-object distance between the camera body and an object in said scene; and wherein:

said emitter output controller adjusts the output power of said output beam emitted by said pointing aid emitter in accordance with the detected camera-to-object distance.

4. A camera as defined in claim 3, further comprising:

means for detecting the camera-to-object distance between the camera body and an object in said scene; and wherein:

said emitter output controller prevents operation of the emitter at camera-to-object distances less than a minimum camera-to-object operating distance.

5. A camera as defined in claim 3 wherein:

the camera further includes an ambient light measurement system that measures the ambient light level in the scene; and said emitter output controller prevents operation of the emitter when the measured ambient light level indicates that the light output beam will not be readily apparent on the object at camera-to-object distances greater than a minimum camera operating distance.

6. A camera as defined in claim 3 wherein:

the camera further includes an ambient light measurement system that measures the ambient light level in the scene; and said emitter output controller responds to the measured ambient light level and varies the output power level of the output beam so that a camera user perceives a beam of equal brightness over a predetermined range of ambient light level on the object.

7. A camera as defined in claim 1, wherein said emitter controller further comprises:

means for setting a maximum emission time interval;

an emission timer for timing an emission time interval commencing with the operation of said pointing aid emitter and terminating at the lapse of said maximum emission time interval or the release of said image capture button from said further position;

an inhibit timer for timing said predetermined inhibit time interval on timing out of said maximum emission time interval by said emission timer or upon release of said image capture button from said further position; and an emitter output controller that is inhibited by operation of said inhibit timer for said inhibit time interval and supplies the output power of the pointing aid emitter only when said inhibit timer has timed out said predetermined inhibit time interval.

8. A camera as defined in claim 7 further comprising:

means for detecting the camera-to-object distance between the camera body and an object in said scene; and wherein:

said emitter output controller adjusts the output power of said output beam emitted by said pointing aid emitter in accordance with the detected camera-to-object distance.

9. A camera as defined in claim 7, further comprising:

means for detecting the camera-to-object distance between the camera body and an object in said scene; and wherein:

said emitter output controller prevents operation of the emitter at camera-to-object distances less than a minimum camera-to-object operating distance.

10. A camera as defined in claim 7 wherein:

the camera further includes an ambient light measurement system that measures the ambient light level in the scene; and said emitter output controller prevents operation of the emitter when the measured ambient light level indicates that the light output beam will not be readily apparent on the object at camera-to-object distances greater than a minimum camera operating distance.

11. A camera as defined in claim 7 wherein:

the camera further includes an ambient light measurement system that measures the ambient light level in the scene; and said emitter output controller responds to the measured ambient light level and varies the output power level of the output beam so that a camera user perceives a beam of equal brightness over a predetermined range of ambient light level on the object.

12. A camera as defined in claim 1 wherein said emitter controller further comprises:

means for setting a running time window upon and during operation of said image capture button in said further position;

means for setting a maximum emission time interval;

an emission timer for timing successive emission time intervals falling within said running time interval, each emission time interval commencing with the operation of said pointing aid emitter and terminating with the lapse of said maximum emission time interval or the release of said image capture button from said further position;

means for accumulating said emission time intervals within said running time interval to provide a running cumulative time interval;

means for comparing said cumulative emission time intervals to a maximum emission time interval and providing an inhibit trigger signal when said cumulative emission time interval exceeds said maximum emission time interval;

an inhibit timer for timing said predetermined inhibit time interval in response to said inhibit trigger signal; and an emitter output controller that is inhibited by operation of said inhibit timer for said inhibit time interval and supplies the output power of the pointing aid emitter only when said inhibit timer has timed out said predetermined inhibit time interval.

13. A camera as defined in claim 12 further comprising:

means for detecting the camera-to-object distance between the camera body and an object in said scene; and wherein:

said emitter output controller adjusts the output power of said output beam emitted by said pointing aid emitter in accordance with the detected camera-to-object distance.

14. A camera as defined in claim 12, further comprising:

means for detecting the camera-to-object distance between the camera body and an object in said scene; and wherein:

said emitter output controller prevents operation of the emitter at camera-to-object distances less than a minimum camera-to-object operating distance.

15. A camera as defined in claim 12 wherein:

the camera further includes an ambient light measurement system that measures the ambient light level in the scene; and said emitter output controller prevents operation of the emitter when the measured ambient light level indicates that the light output beam will not be readily apparent on the object at camera-to-object distances greater than a minimum camera operating distance.

16. A camera as defined in claim 12 wherein:

the camera further includes an ambient light measurement system that measures the ambient light level in the scene; and said emitter output controller responds to the measured ambient light level and varies the output power level of the output beam so that a camera user perceives a beam of equal brightness over a predetermined range of ambient light level on the object.

17. A method of operating a camera pointing aid for assisting a camera user in pointing the camera so as to capture an image of an object in a scene through a camera objective lens upon pressing an image capture button to an image capture position, the method comprising the steps of:

detecting the pressing of the image capture button of the camera to a output beam emitting position;

determining whether output beam emission is disabled;

responding to the detected pressing of the button when light emission is not disabled by emitting a light output beam from a pointing aid emitter such that the output beam is generally aligned with the optical axis of the objective lens and illuminates the object; and following emission of the light output beam, disabling output beam emission in the further response to the pressing of the image capture button for a predetermined inhibit time interval.

18. A method as defined in claim 17 further comprising the steps of:

detecting the camera-to-object distance between the camera body and an object in said scene; and adjusting the output power of said output beam emitted by said pointing aid emitter in accordance with the detected camera-to-object distance.

19. A method as defined in claim 17, further comprising the steps of:

detecting the camera-to-object distance between the camera body and an object in said scene; and preventing emission of said output beam at camera-to-object distances less than a minimum camera-to-object operating distance.

20. A method as defined in claim 17, further comprising the steps of:

measuring the ambient light level in the scene; and preventing emission of the output beam when the measured ambient light level indicates that the output beam will not be readily visible on the object at camera-to-object distances greater than a minimum camera operating distance.

21. A method as defined in claim 17, further comprising the steps of:

measuring the ambient light level in the scene; and varying the output power level of the output beam in relation to the measured ambient light level so that a camera user perceives an output beam of equal brightness on the object over a predetermined range of ambient light level.

22. A method as defined in claim 17 further comprising the steps of:

setting a maximum emission time interval;

timing an emission time interval commencing with the operation of said pointing aid emitter and terminating at the lapse of said maximum emission time interval or the release of said image capture button from said further position; and starting an inhibit timer for timing said predetermined inhibit time interval on termination of said emission interval timing.

23. A method as defined in claim 22 further comprising the steps of:

detecting the camera-to-object distance between the camera body and an object in said scene; and adjusting the output power of said output beam emitted by said pointing aid emitter in accordance with the detected camera-to-object distance.

24. A method as defined in claim 22, further comprising the steps of:

detecting the camera-to-object distance between the camera body and an object in said scene; and preventing emission of said output beam at camera-to-object distances less than a minimum camera-to-object operating distance.

25. A method as defined in claim 22, further comprising the steps of:

measuring the ambient light level in the scene; and preventing emission of the output beam when the measured ambient light level indicates that the output beam will not be readily visible on the object at camera-to-object distances greater than a minimum camera operating distance.

26. A method as defined in claim 22, further comprising the steps of:

measuring the ambient light level in the scene; and varying the output power level of the output beam in relation to the measured ambient light level so that a camera user perceives an output beam of equal brightness on the object over a predetermined range of ambient light level.

27. A method of operating a camera pointing aid for assisting a camera user in pointing the camera so as to capture an image of an object in a scene through a camera objective lens upon pressing an image capture button to an image capture position, the method comprising the steps of:

detecting the pressing of the image capture button of the camera to a output beam emitting position and determining whether output beam emission is disabled;

responding to the detected pressing of the button when light emission is not disabled by emitting a light output beam from a pointing aid emitter such that the output beam is generally aligned with the optical axis of the objective lens and illuminates the object;

setting a running time window and a maximum emission time interval upon and during operation of said image capture button in said output beam emission position;

timing successive emission time intervals falling within said running time interval, each emission time interval commencing with the operation of said pointing aid emitter and terminating with the lapse of said maximum emission time interval or the release of said image capture button from said output beam emission position;

accumulating said emission time intervals within said running time interval to provide a running cumulative time interval; and comparing said cumulative emission time intervals to a maximum emission time interval and disabling emission of said light output beam when said cumulative emission time interval exceeds said maximum emission time interval for a predetermined inhibit time interval.

28. A method as defined in claim 27 further comprising the steps of:

detecting the camera-to-object distance between the camera body and an object in said scene; and adjusting the output power of said output beam emitted by said pointing aid emitter in accordance with the detected camera-to-object distance.

29. A method as defined in claim 27, further comprising the steps of:

detecting the camera-to-object distance between the camera body and an object in said scene; and preventing emission of said output beam at camera-to-object distances less than a minimum camera-to-object operating distance.

30. A method as defined in claim 27, further comprising the steps of:

measuring the ambient light level in the scene; and preventing emission of the output beam when the measured ambient light level indicates that the output beam will not be readily visible on the object at camera-to-object distances greater than a minimum camera operating distance.

31. A method as defined in claim 27, further comprising the steps of:

measuring the ambient light level in the scene; and varying the output power level of the output beam in relation to the measured ambient light level so that a camera user perceives an output beam of equal brightness on the object over a predetermined range of ambient light level.

32. A method of operating a camera pointing aid for assisting a camera user in pointing the camera so as to capture an image of an object in a scene through a camera objective lens upon depression of a camera image capture button, the method comprising the steps of:

detecting the pressing of the image capture button of the camera to a first position;

starting a timer on pressing the image capture button to the first position to time out an inhibit time interval;

responding to the pressing of the button by emitting a output-light output beam from an emitter such that the output beam is generally aligned with the optical axis of the objective lens and illuminates the object; and following emission of the light beam, inhibiting the further response to the pressing of the button to said first position and emission of the output beam for said inhibit time interval.

* * * * *